US008599545B2

(12) United States Patent
Walker et al.

(10) Patent No.: US 8,599,545 B2
(45) Date of Patent: *Dec. 3, 2013

(54) PORTABLE FOLDING ELECTRONIC DEVICE

(75) Inventors: David Ryan Walker, Waterloo (CA); Norman Ladouceur, Waterloo (CA); Jason T. Griffin, Waterloo (CA)

(73) Assignee: Blackberry Limited, Waterloo, Ontario (CA)

( * ) Notice: Subject to any disclaimer, the term of this patent is extended or adjusted under 35 U.S.C. 154(b) by 105 days.

This patent is subject to a terminal disclaimer.

(21) Appl. No.: 13/207,513

(22) Filed: Aug. 11, 2011

(65) Prior Publication Data

US 2011/0292585 A1   Dec. 1, 2011

Related U.S. Application Data

(63) Continuation of application No. 12/401,334, filed on Mar. 10, 2009, now Pat. No. 8,023,256.

(51) Int. Cl.
  *G06F 1/16*  (2006.01)
  *H05K 5/00*  (2006.01)
  *H05K 7/00*  (2006.01)
  *H04M 1/00*  (2006.01)

(52) U.S. Cl.
  USPC ..................................... 361/679.27; 45/575.3

(58) Field of Classification Search
  USPC ............. 361/679.27, 679.3; 455/575.1–575.4
  See application file for complete search history.

(56) References Cited

U.S. PATENT DOCUMENTS

| 6,504,707 | B2 | 1/2003 | Agata et al. |
| 6,639,788 | B1 | 10/2003 | Liao et al. |
| 6,778,196 | B2 | 8/2004 | Nakamura |
| 6,826,043 | B2 | 11/2004 | Chang |
| 6,829,139 | B1 | 12/2004 | Duarte |
| 6,903,927 | B2 | 6/2005 | Anlauff |
| 6,947,279 | B2 | 9/2005 | Cheng et al. |
| 6,963,485 | B2 | 11/2005 | Hong |

(Continued)

FOREIGN PATENT DOCUMENTS

| EP | 0626632 A1 | 11/1994 |
| WO | WO2007/137428 A1 | 12/2007 |

OTHER PUBLICATIONS

"HP Pavilion tx1000 Entertainment Tablet Features 'Twist and Touch'", http://www.twomobile.com/content/100/341/C11572/, 3 pages.

(Continued)

*Primary Examiner* — Adrian S Wilson

(57) ABSTRACT

A portable folding electronic device has a base with a longer length dimension and a shorter width dimension and a user interface on one surface. The user interface may be oriented for use when the base has a portrait orientation. The device also has a screen unit with a longer length dimension and a shorter width dimension and a screen on one surface. A linkage connects the base to the screen unit. The linkage provides at least two degrees of freedom between the base and the screen unit such that the screen unit may be moved to a first position folded onto the base, with the length dimension of said screen unit aligned with the length dimension of the base, and to a second position tilted with respect to the base, with the length dimension of the screen unit aligned with the width dimension of the base.

20 Claims, 6 Drawing Sheets

(56) References Cited

U.S. PATENT DOCUMENTS

| | | | |
|---|---|---|---|
| 7,068,497 | B2 | 6/2006 | Chu |
| 7,092,246 | B2 | 8/2006 | Tanaka et al. |
| 7,100,876 | B2 | 9/2006 | Tseng et al. |
| 7,198,237 | B2 | 4/2007 | Cho et al. |
| 7,215,538 | B1 | 5/2007 | Chen et al. |
| 7,255,317 | B2 | 8/2007 | Huang et al. |
| 7,375,956 | B2 | 5/2008 | Chuang et al. |
| 7,467,000 | B2 * | 12/2008 | Shiba .................. 455/575.8 |
| 7,573,703 | B2 | 8/2009 | Chuang et al. |
| 7,639,484 | B2 | 12/2009 | Chen et al. |
| 7,836,554 | B2 * | 11/2010 | Fu .................................. 16/362 |
| 8,023,256 | B2 * | 9/2011 | Walker et al. ............ 361/679.27 |
| 2004/0066614 | A1 | 4/2004 | Hong |
| 2004/0114319 | A1 | 6/2004 | Hill et al. |
| 2004/0145564 | A1 | 7/2004 | Duarte |
| 2005/0052833 | A1 | 3/2005 | Tanaka et al. |
| 2007/0086155 | A1 | 4/2007 | Chen et al. |
| 2007/0159783 | A1 | 7/2007 | Chen et al. |
| 2007/0159784 | A1 | 7/2007 | Chen et al. |
| 2007/0217131 | A1 | 9/2007 | Kehr |
| 2007/0217135 | A1 | 9/2007 | Chuang et al. |
| 2008/0094792 | A1 | 4/2008 | Chen et al. |
| 2008/0117578 | A1 | 5/2008 | Moscovitch |
| 2008/0151481 | A1 | 6/2008 | Misawa |
| 2008/0232044 | A1 | 9/2008 | Moscovitch |
| 2008/0232054 | A1 | 9/2008 | Chen et al. |

OTHER PUBLICATIONS

"Rugged convertible notebook and tablet PC with Intel Core Duo processor", http://www.epn-online.com/page/new50974/rugged-convertible-notebook-and-tablet-pc-with-intel-core-duo-processor.html, 5 pages.

"Lenovo ThinkPad X61 Tablet Laptop", http://www.zwtm.com/2007/12/lenovo-thinkpad-x61-tablet-laptop/, 4 pages.

"The TV Enabled Sharp 911SH Handset", http://news.softpedia.com/news/The-TV-Enabled-Sharp-911SH-Handset-40799.shtml, 3 pages.

"Samsung U900 coming to Verizon as the Flipshot", http://www.electronista.com/articles/07/10/11/samsung.flipshot.leak/, 5 pages.

* cited by examiner

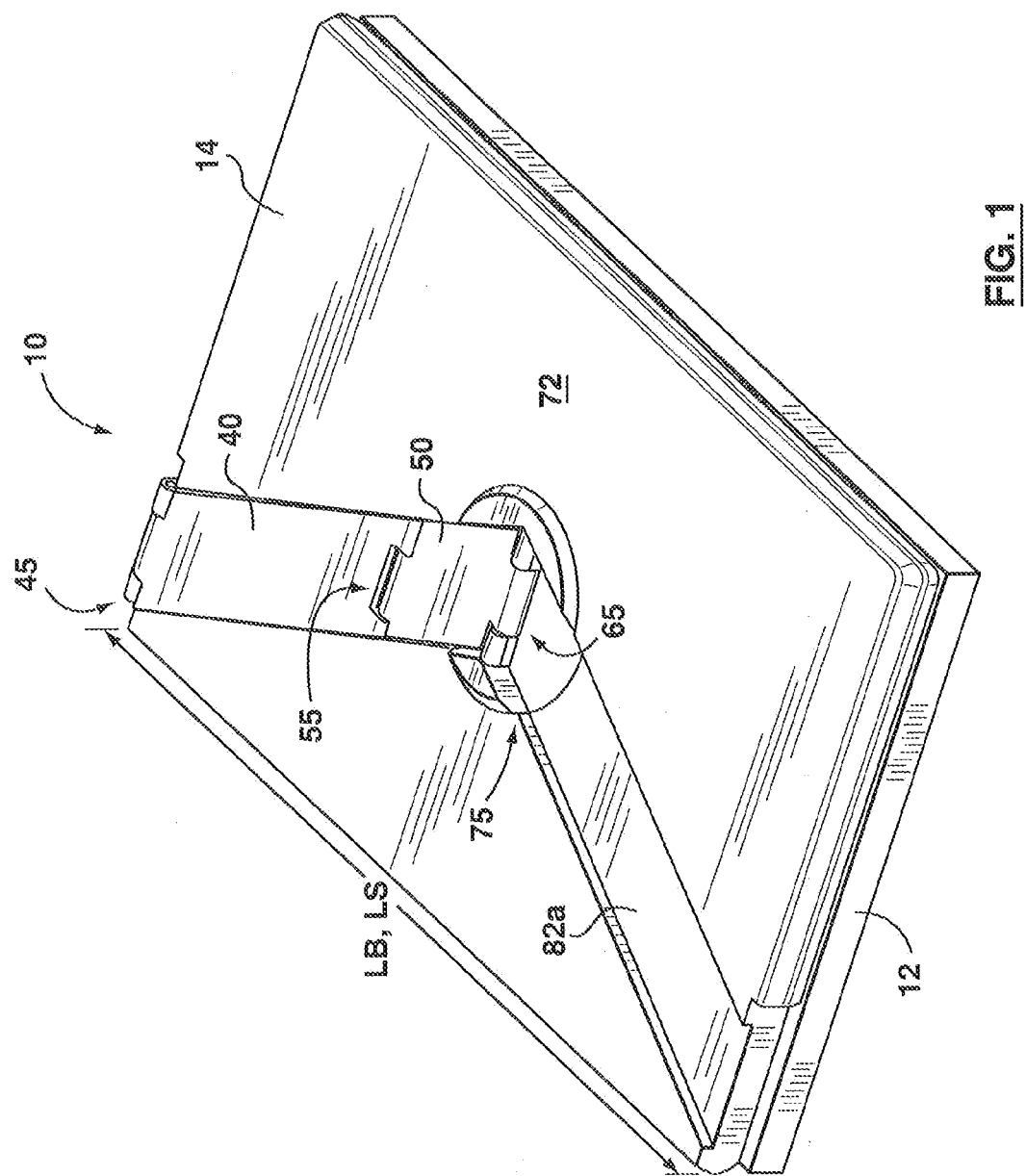

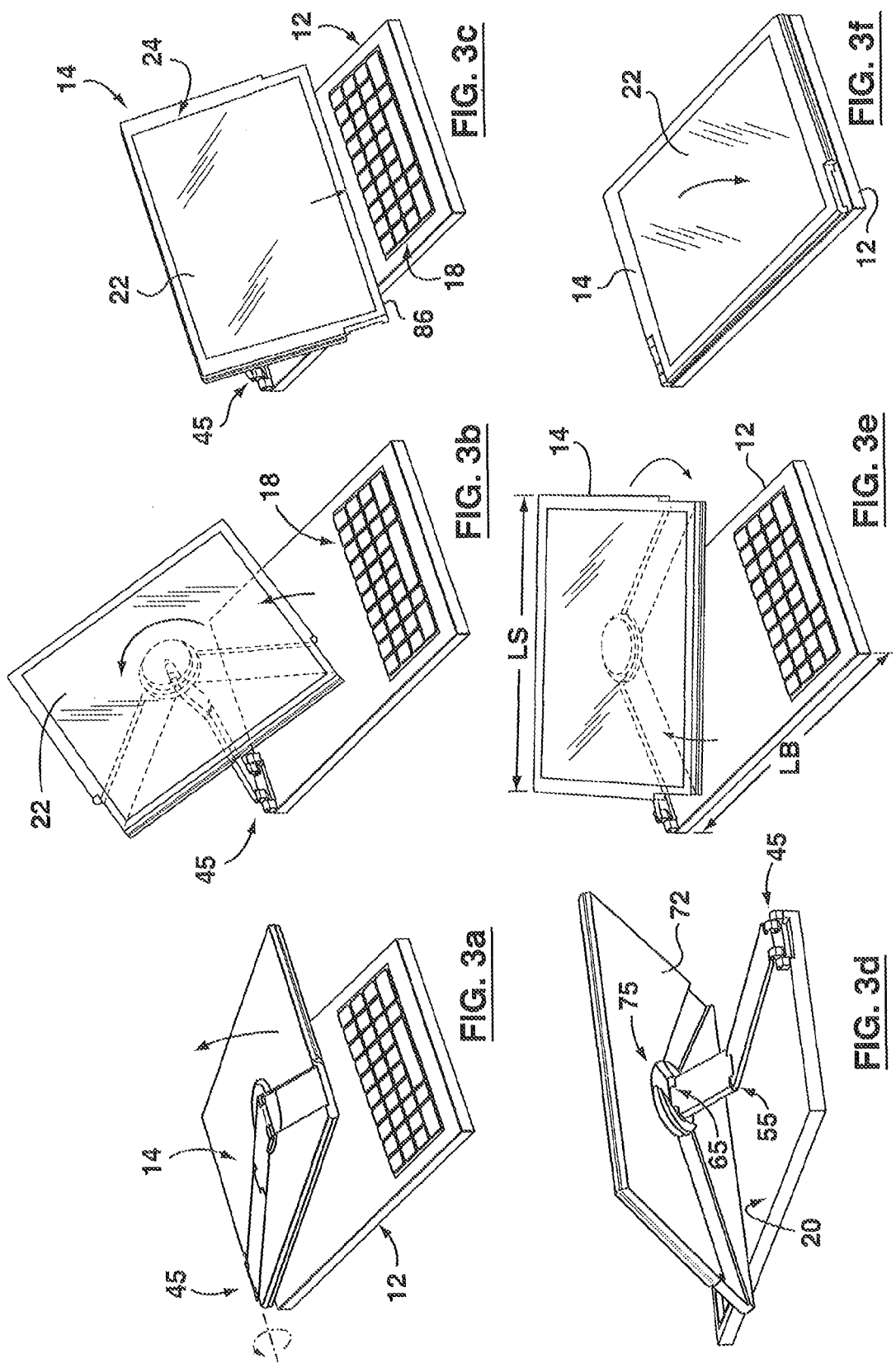

PORTABLE FOLDING ELECTRONIC DEVICE

CROSS-REFERENCE TO RELATED APPLICATION

This application is a continuation of U.S. application Ser. No. 12/401,334 filed Mar. 10, 2009, now U.S. Pat. No. 8,023,256 the contents of which are incorporated herein by reference.

BACKGROUND

This specification relates to a portable folding electronic device.

Many portable electronic devices have a screen unit hinged to a base, with the base supporting a user interface. With such devices, the screen unit may fold down so that the screen faces the keys on the base. In this closed configuration, the screen and keys are shielded. Such folding portable devices (as, for example, a flip phone) typically have a rectangular configuration with the hinge at the short side of the base and screen unit. In consequence, the screen is long and narrow which, at least for some users, may make reading the screen difficult.

BRIEF DESCRIPTION OF THE DRAWINGS

In the figures which illustrate example embodiments,

FIG. 1 is a front perspective view of a portable folding electronic device made in accordance with a first embodiment.

DETAILED DESCRIPTION

Figure 2A:
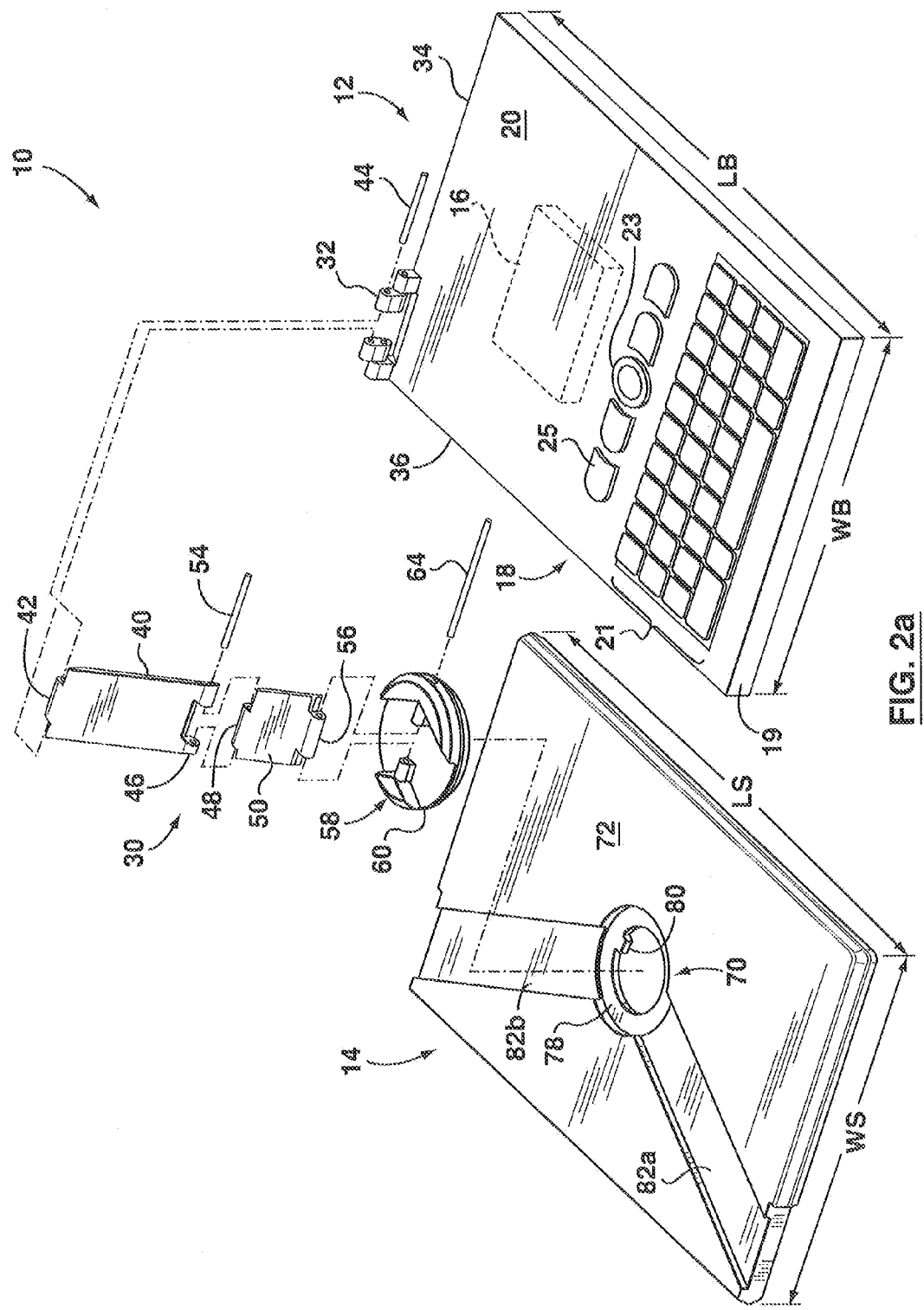
FIG. 2a is an exploded view of the device of FIG. 1, FIGS. 2b, 2c, and 2d are perspective, top and front views, respectively, of a portion of the device of FIG. 1, FIGS. 3a to 3f are perspective views illustrating operation of the device of FIG. 1.
Figure 2B:
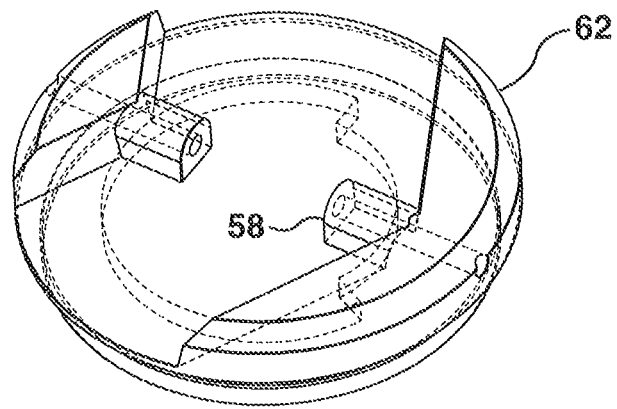
Figure 2C:
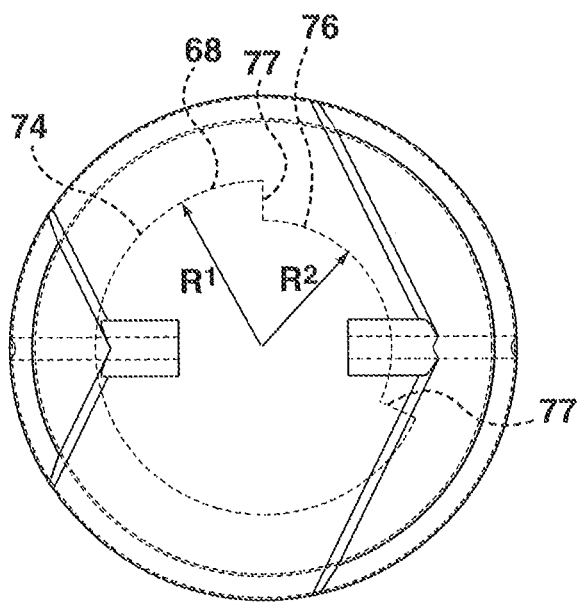
Figure 2D:
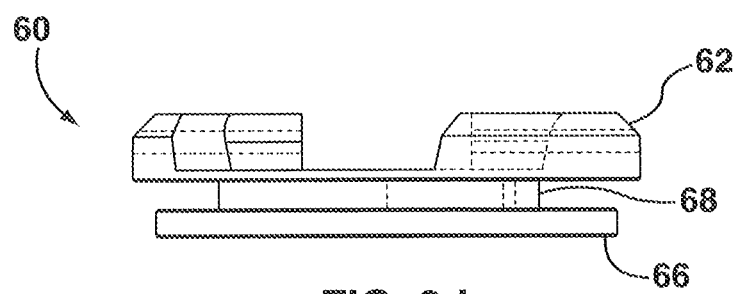

In overview, a portable folding electronic device has a base with a longer length dimension and a shorter width dimension and a user interlace on one surface. The user interface may be oriented for use when the base has a portrait orientation. The device also has a screen unit with a longer length dimension and a shorter width dimension and a screen on one surface. A linkage connects the base to the screen unit. The linkage provides at least two degrees of freedom between the base and the screen unit such that the screen unit may be moved to a first position folded onto the base, with the length dimension of said screen unit aligned with the length dimension of the base, and to a second position tilted with respect to the base, with the length dimension of the screen unit aligned with the width dimension of the base.

Turning to FIGS. 1, 2a, 3a, and 3b, a portable folding electronic device 10 has a rectangular base 12 and a rectangular screen unit 14. The base has a length dimension LB which is substantially equal to the length dimension LS of the screen unit and a width dimension WB which is substantially equal to the width dimension WS of the screen unit. The base houses a processor 16 and has a user interface 18 on its front surface 20 disposed proximate a bottom edge 19 of the base. The user interface includes keys arranged as a keyboard 21 with a trackball 23 and navigation keys 25 arrayed above the keyboard. As will be apparent, the user interface 18 is aligned with the width dimension WB of the base. Thus, the keyboard is oriented for use when the base has a portrait orientation. The screen unit has a screen 22 (FIG. 3c) on its front surface 24 (FIG. 3c).

A linkage 30 connects the base 12 to the screen unit 14 as follows. A hinge wing 32 is mounted to the top edge 34 of the base proximate one side 36 of the base. A first link arm 40 with an end 42 formed as a hinge wing is hinged to hinge wing 32 by pivot pin 44 to form a hinge joint 45. The opposite end 46 of the first link arm 40 is also formed as a hinge wing and hinged to a hinge winged end 48 of a second link arm 50 by a pivot pin 54 to form a hinge joint 55. The opposite end 56 of the second link arm 50 is also formed as a hinge wing and is hinged to a hinge part top section 58 of a pivot disk 60 by a pivot pin 64 to form a hinge joint 65.

The pivot disk 60 is received for limited rotational movement by a receptor 70 in the back wall 72 of the screen unit as follows. Turning to FIGS. 2a to 2d, pivot disk 60 has a top section 62 threaded to a bottom section 66. The assembled pivot disk has a neck 68 with a first section 74 with a radius R1 and a second section 76 with a smaller radius R2. Neck section 74 transitions to neck section 76 at walls 77 which, as will become apparent, act as limit stops. The receptor 70 is formed by a circular inward step in the back wall 72 of the screen unit to an annular ring 78 with a radially inwardly projecting tang 80. During manufacture, the bottom section 66 of the pivot disk is registered with the annular ring at the interior side of back wall 72 and the top section 62 of the pivot disk is then threaded to the bottom section. With this assembly, the top and bottom sections 62, 66 of the pivot disk sandwich the annular ring 78 which projects inwardly toward the neck 68 of the pivot disk. During assembly, the pivot disk is oriented such that the tang 80 projecting from the annular ring is located at the smaller radius section 76 of the neck 68. The pivot disk 60 and receptor 70 thereby form a pivot joint 75 with rotational freedom limited by the limit stops 77 stopping against tang 80.

The back wall 72 of the screen unit 14 also has a V-shaped notch with the notches 82a, 82b of the V-shape meeting at the receptor 70.

With this arrangement, the screen unit may be moved to a first position whereat device 10 assumes the closed configuration illustrated in FIG. 1. In this configuration, the screen unit is folded onto the base with the screen unit lying against the keypad of the base with the length dimension LS of the screen unit aligned with the length dimension LB of the base. In this closed configuration, link arms 40 and 50 are aligned and lie in notch 82b.

Referring to FIGS. 3a to 3f, device 10 may be unfolded from its stored configuration as follows. The screen unit 14 may first be pivoted about hinge 45 as seen in FIG. 3a. Once the screen unit has been pivoted to a sufficient extent about hinge 45, the screen unit may be pivoted about hinge 65, as seen in FIG. 3b. Next, the screen unit may be rotated about pivot joint 75 so that the length dimension LS of the screen unit becomes aligned with the width dimension WB of the base. The screen unit may then be again pivoted about hinge 45 to a second position tilted with respect to the base with the bottom wall 86 of the screen unit abutting the front surface 20 of the base, as shown in FIGS. 3c and 3d. The screen unit may be pivoted about hinge joint 55 to adjust the tilt of the screen unit. It will be apparent that with the screen unit at its second position illustrated in FIGS. 3c and 3d, the screen 22 of the screen unit is at the same side of the device 10 as the user interface 18. It will also be apparent that the bottom edge 86 of the screen unit overlies the front surface 20 of the base between the keyboard 18 and the top edge 34 of the base. With the screen unit 14 in this second position, screen 22 has a landscape orientation while the user interface 18 has a portrait orientation on the base. The landscape orientation of the screen may make the screen easier to read.

From this second position of the screen unit illustrated in FIGS. 3c and 3d, the screen unit may be moved to a third position. More specifically, as shown in FIG. 3e, the screen unit may again be rotated about pivot joint 65 so that its length dimension LS is again aligned with the length dimension LB of the base. The screen unit may then be pivoted about hinge joints 45, 55, and 65 so that the screen unit lies atop base 12, but this time with the screen 22 facing outwardly, as illustrated in FIG. 3f. The configuration of FIG. 3f is a tablet-type configuration which would have advantages where screen 22 is a touch screen. In the tablet-type configuration, link arms 40 and 50 are aligned and lie in notch 82a.

While not illustrated in FIGS. 1 to 3f, the pivot disk may have a central opening through which wires from the base may pass to facilitate electrical connections between the base and screen unit.

While not preferred, in an alternate embodiment, screen unit 14 could move from the first position illustrated in FIG. 1 to a position whereat the length dimension LS of the screen unit is aligned with the width dimension WB of the base 12 absent hinge joints 55 and 65. Specifically, absent these hinge joints, the screen unit could still be pivoted about hinge joint 45 as illustrated in FIG. 3a, however, in this embodiment, the screen unit would be pivoted about the hinge joint 45 until it made a right angle with the base. The screen unit would then be rotated about pivot joint 75 to align its length dimension with the width dimension of the base. In this position, the screen unit would be spaced from the base by the upright link arms 40, 50. With this modification, the screen unit could not be moved to the described tablet-type configuration.

In both embodiments, the hinge joint 45 provides a first degree of freedom for the screen unit and the pivot joint 75 provides a second degree of freedom for the screen unit to allow the screen unit to move from its first position when the device is in a closed configuration to its second position whereat its length dimension LS is aligned with the width dimension WB of the base.

Figure 4:
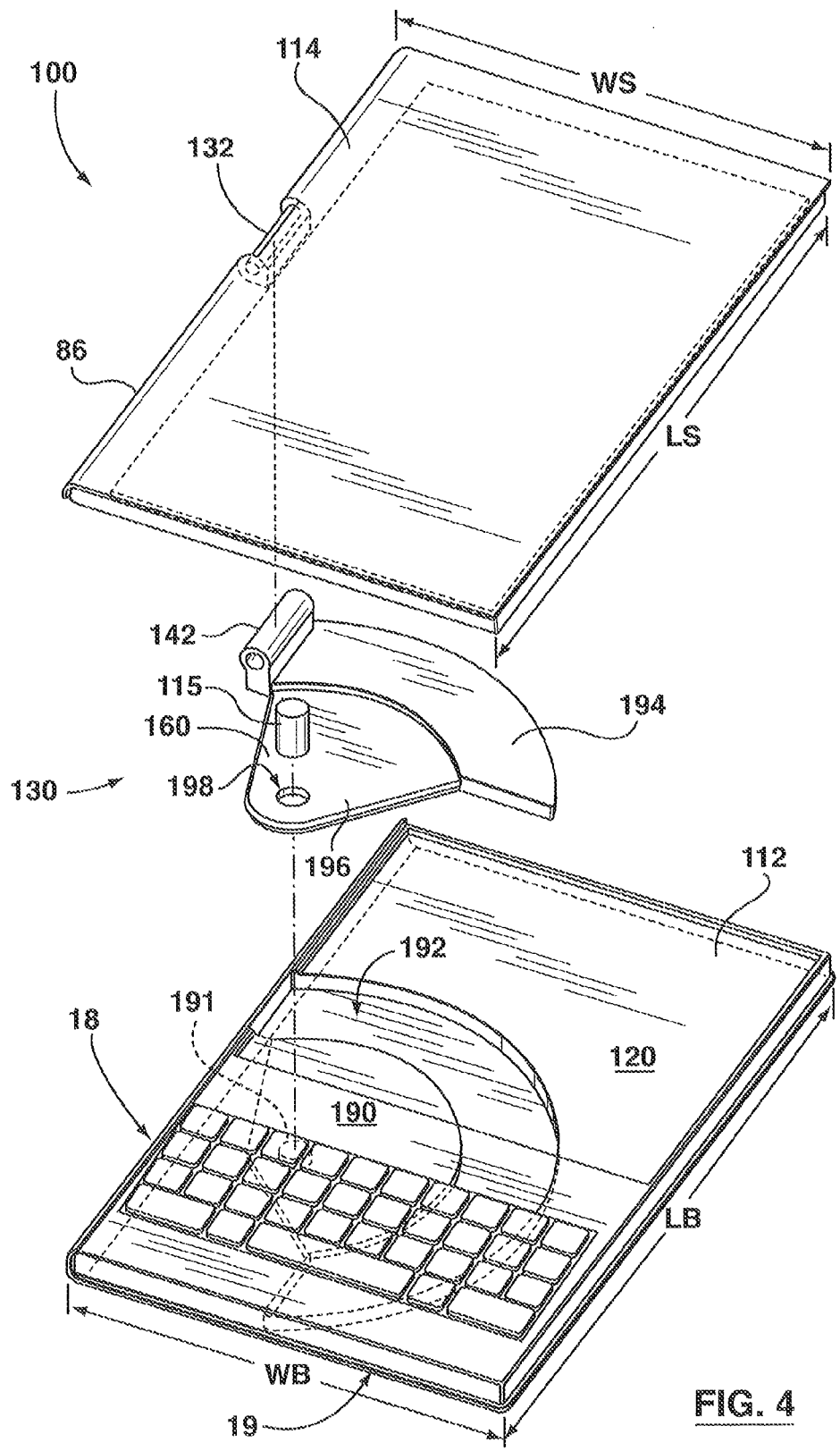
FIG. 4 is an exploded view of a portable folding electronic device made in accordance with a second embodiment.
Figure 5A:
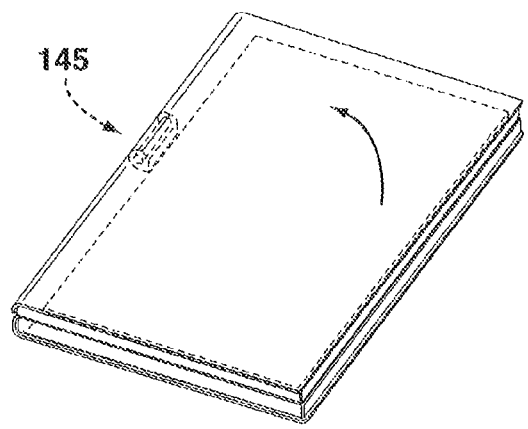
FIGS. 5a to 5c are perspective views illustrating operation of the device of FIG. 4.
Figure 5B:
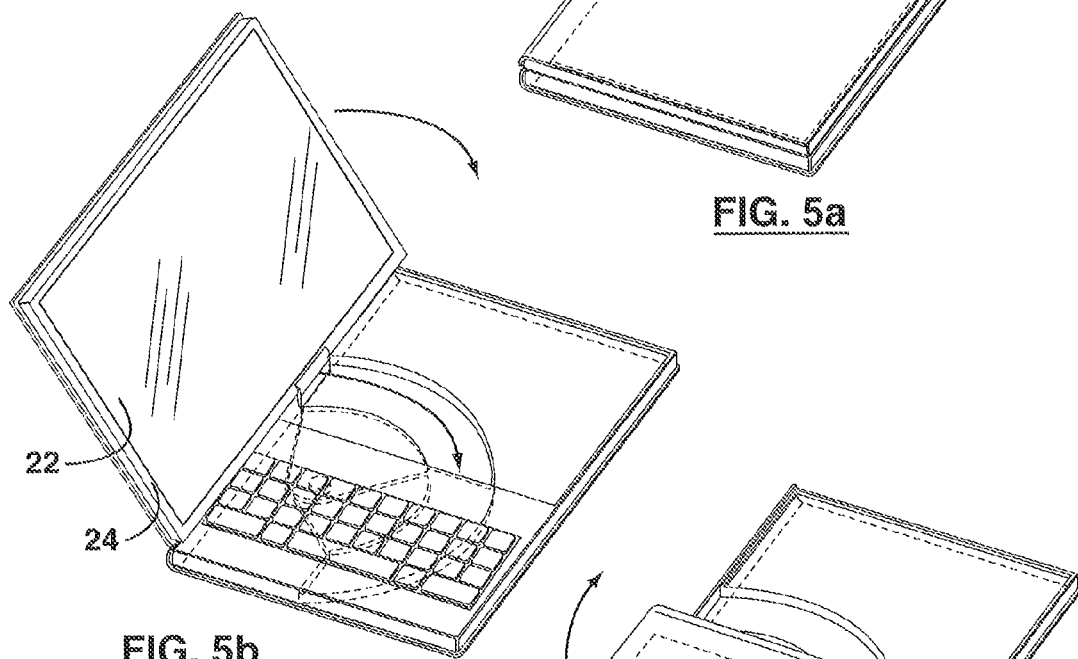

Turning to FIG. 4, in another embodiment wherein like parts have been given like reference numerals, a portable folding electronic device 100 has a rectangular base 112 and a rectangular screen unit 114. The base has a length dimension LB which is substantially equal to the length dimension LS of the screen unit and a width dimension WB which is substantially equal to the width dimension WS of the screen unit. The base houses a processor and has a user interface 18 on its front surface 20 which is a keyboard disposed proximate a bottom edge 19 of the base and aligned with the width dimension WB of the base. The screen unit has a screen 22 (FIG. 5b) on its front surface 24 (FIG. 5b).

The front surface 120 of base 112 has a pie-shaped depression 190 terminating at its periphery in a deeper curved notch 192. Front surface 120 has a hole 191 at the radial centre of the pie-shaped depression 190. The pie-shaped depression and curved notch extend under the middle portion of the keyboard.

A linkage 130 connects the base 112 to the screen unit 114 as follows. A hinge wing 132 is mounted to the bottom edge 86 of the screen unit 112 midway along the bottom edge. A link arm 160 in the nature of a pivot plate with an end 142 formed as a hinge wing is hinged to hinge wing 132 by a pivot pin (not shown) to form a hinge joint 145 (FIG. 5a).

The link arm 160 has a peripheral thickened curved band 194 and a thinner pie-shaped inner section 196 with a hole 198. The curved band of the link arm is received within the curved notch 192 in the front surface of the base 112 and the pie-shaped inner section 196 of the link arm is received within the pie-shaped depression of the base 112. A pin 115 extends through the holes 191 and 198 and abuts the back side of the keyboard to lock the link arm to the base 112 and provide a pivot joint 176 (FIG. 5c).

In manufacture, the link arm is first secured to the base 112 by pin 115 and then the keyboard is installed. Thereafter, the screen unit may be attached to the base 112 by completing hinge joint 145.

The pin joining the link arm to the base may be annular and receive wires from the base to allow for an electrical connection between the base and screen unit.

Figure 5D:
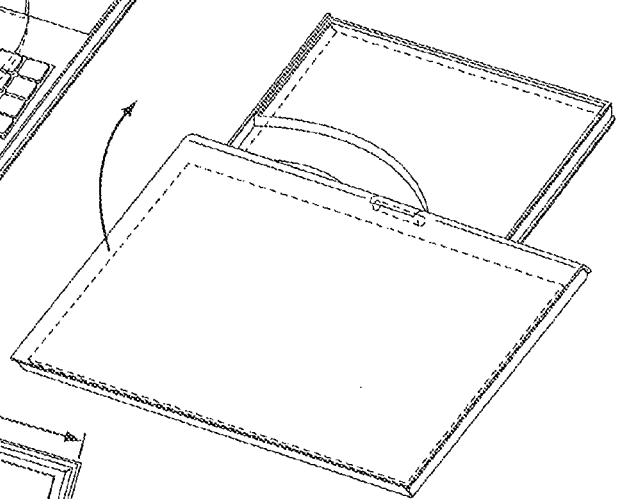
Figure 5C:
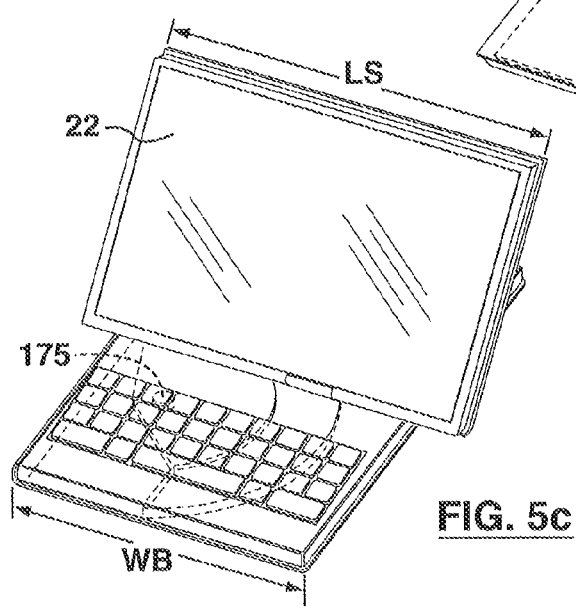

Turning to FIGS. 6a to 5d, in use, device 100 may be unfolded from its stored configuration seen in FIG. 5a as follows. The screen unit 114 may first be pivoted about hinge 145 as seen in FIG. 5a. Next the screen unit may be twisted from its position shown in FIG. 5b to the position shown in FIG. 5c by rotating the link arm 160. The length of the curved band 194 of the link arm and the curved notch 192 in the base provide limit stops to the rotation of the link arm. In the position shown in FIG. 5c, the length dimension LS of the screen unit 114 is aligned with the width dimension WB of the base 112. In this position, the tilt of the screen unit can be adjusted by pivoting the screen unit about hinge 145. Optionally, from the position of the screen unit in FIG. 5c, the screen unit could be quickly folded down to the position shown in FIG. 5d should a user wish to temporarily shield the keyboard and screen.

Alternatively, the device 100 could be unfolded from its stored configuration shown in FIG. 5a by first rotating the screen unit to the position shown in FIG. 6d and then pivoting the screen unit about hinge 145 to the position shown in FIG. 5c. As a further option, the screen unit may be moved from its stored configuration of FIG. 5a to the open position of FIG. 5c in one fluid motion wherein the screen unit is simultaneously rotated and pivoted.

While the base of the devices has been described as having a keyboard or a keyboard with a trackball and navigation keys, any other suitable user interface may be provided. For example, the user interface of the base could comprise one or more of the following: keyboard, keypad, touch screen, game pad interface, track ball, navigation keys, and gesture pad. Where the user interface included a touch screen, this could function as both an input and an output device.

While the exemplary devices shown have a rectangular base and a rectangular screen unit, other shapes would be possible provided they have a longer length dimension and a shorter width dimension.

Other modifications will be apparent to those skilled in the art.

What is claimed is:

1. A portable folding electronic device having a user interface and a screen, comprising:
   a base with a user interface on one surface;
   a screen unit having one surface and a first notch and a second notch on an opposite surface, said first notch extending from proximate one corner of said screen unit and said second notch extending from proximate an adjacent corner of said screen unit at an angle to said first notch; and
   a linkage connecting said base to said screen unit, said linkage providing at least one hinge joint and at least one pivot joint between said base and said screen unit such that said screen unit may be moved to a first position folded onto said base with said linkage aligned with, and lying in, said first notch, to a second position tilted with respect to said base, and to a third position folded onto said base with said screen facing directly away from said user interface and said linkage aligned with, and lying in, said second notch.

2. The device of claim 1 wherein said screen, when said screen unit is in said first position, faces said user interface and said screen, when said screen unit is in said second position, is at a same side of said device as said user interface.

3. The device of claim 2 wherein a bottom edge of said base is aligned with a width dimension of said base and said user interface is disposed proximate said bottom edge of said base and wherein, when said screen unit is in said second position, a bottom edge of said screen unit overlies said one surface of said base between said user interface and a top edge of said base.

4. The device of claim 3 wherein a length dimension of said base is substantially the same as a length dimension of said screen unit and wherein said width dimension of said base is substantially the same as a width dimension of said screen unit.

5. The device of claim 1 wherein said user interface comprises a plurality of keys.

6. A portable device having a user interface and a screen, comprising:
   a base having a user interface on one surface;
   a screen unit having a screen on one surface and a first notch and a second notch on an opposite surface, said first notch extending from proximate one corner of said screen unit and said second notch extending from proximate an adjacent corner of said screen unit at an angle to said first notch; and
   at least one link arm connecting said base to said screen through a hinge connection to one of said base and said screen unit and a pivoting connection to another of said base and said screen unit such that said screen unit may be moved to a first position folded onto said base with said at least one link arm aligned with, and lying in, said first notch, and to a second position tilted with respect to said base with said screen unit aligned with said width dimension of said base, and to a third position folded onto said base with said screen facing directly away from said user interface and said at least one link arm aligned with, and lying in, said second notch.

7. A portable device having a user interface and a screen, comprising:
   a base having a user interface on one surface;
   a screen unit having a screen on one surface and a first notch and a second notch on an opposite surface, said first notch extending from proximate one corner of said screen unit and said second notch extending from proximate an adjacent corner of said screen unit at an angle to said first notch; and
   a linkage connecting said base to said screen through joints providing at least three degrees of freedom between said base and said screen unit such that said screen unit may be moved to a first position folded onto said base with said linkage aligned with, and lying in, said first notch, to a second position tilted with respect to said base with said screen unit aligned with said width dimension of said base, and to a third position folded onto said base with said screen facing directly away from said user interface and said linkage aligned with, and lying in, said second notch.

8. The device of claim 7 wherein a bottom edge of said base is aligned with a width dimension of said base and said user interface is disposed proximate said bottom edge of said base and wherein, when said screen unit is in said second position, a bottom edge of said screen unit overlies said one surface of said base between said user interface and a top edge of said base.

9. The device of claim 7 wherein said linkage comprises a link arm and wherein said joints comprise a hinge joint extending between said link arm and one of said base and said screen unit.

10. The device of claim 9 wherein said joints comprise a pivot joint extending between said link arm and another of said base and said screen unit.

11. The device of claim 9 wherein said link arm is a first link arm and wherein said linkage further comprises a second link arm and wherein said joints comprise a pivot joint extending between said second link arm and another of said base and said screen unit.

12. The device of claim 10 wherein said hinge joint is a first hinge joint and wherein said linkage further provides a second hinge joint between said base and said screen unit so that said screen unit may be moved to said third position folded onto said base with a length dimension of said screen unit aligned with a length dimension of said base and with said screen facing directly away from said user interface.

13. The device of claim 12 wherein said second hinge joint is proximate said pivot joint.

14. The device of claim 11 wherein said hinge joint is a first hinge joint and wherein said linkage further provides a second hinge joint between said base and said screen unit so that said screen unit may be moved to said third position folded onto said base with a length dimension of said screen unit aligned with a length dimension of said base and with said screen facing directly away from said user interface.

15. The device of claim 14 wherein said second hinge joint is proximate said pivot joint.

16. The device of claim 11 wherein said first link arm is joined to said second link arm by a hinge joint.

17. The device of claim 10 wherein said hinge joint extends between said screen unit and said linkage at a bottom edge of said screen unit, said bottom edge extending along a long dimension of said screen unit.

18. The device of claim 12 wherein said first hinge joint extends between said base and said link arm at a top edge of said base, said top edge extending along a width dimension of said base.

19. The device of claim 14 wherein said first hinge joint extends between said base and said link arm at a top edge of said base, said top edge extending along a width dimension of said base.

20. The device of claim 11 further comprising at least one limit stop to limit a degree of pivoting about said pivot joint.

* * * * *